United States Patent
Kondo et al.

(10) Patent No.: US 7,565,664 B2
(45) Date of Patent: Jul. 21, 2009

(54) DISTRIBUTED OBJECT CONTROLLING METHOD AND ITS CARRYING OUT SYSTEM

(75) Inventors: Mutsuko Kondo, Yokohama (JP); Yasushi Sato, Fujisawa (JP); Atsushi Sashino, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 949 days.

(21) Appl. No.: 10/602,602

(22) Filed: Jun. 25, 2003

(65) Prior Publication Data

US 2004/0045010 A1 Mar. 4, 2004

(30) Foreign Application Priority Data

Jun. 28, 2002 (JP) ............................. 2002-188934

(51) Int. Cl.
*G06F 3/00* (2006.01)
*G06F 9/44* (2006.01)
*G06F 9/46* (2006.01)
*G06F 13/00* (2006.01)

(52) U.S. Cl. ......................... 719/319; 719/313; 709/217

(58) Field of Classification Search ............... 707/1, 707/10; 709/201, 213–219, 230–232, 245; 719/310–320

See application file for complete search history.

(56) References Cited

U.S. PATENT DOCUMENTS

| | | | | |
|---|---|---|---|---|
| 5,287,507 | A * | 2/1994 | Hamilton et al. | 719/315 |
| 5,764,906 | A * | 6/1998 | Edelstein et al. | 709/219 |
| 5,960,194 | A * | 9/1999 | Choy et al. | 707/102 |
| 5,987,512 | A * | 11/1999 | Madany et al. | 709/221 |
| 5,995,999 | A | 11/1999 | Bharadhwaj | |
| 6,108,754 | A * | 8/2000 | Lindholm | 711/122 |
| 6,886,077 | B2 * | 4/2005 | Cuomo et al. | 711/118 |
| 2002/0099970 | A1 * | 7/2002 | Zhao et al. | 714/4 |
| 2003/0105837 | A1 * | 6/2003 | Kamen et al. | 709/220 |
| 2003/0204517 | A1 * | 10/2003 | Skinner et al. | 707/100 |

(Continued)

FOREIGN PATENT DOCUMENTS

JP 06019791 1/1994

(Continued)

OTHER PUBLICATIONS

Sundsted, JNDI overview, Part 1-Part 4, JavaWorld.com, Jan. 1, 2000-Mar. 31, 2000.*

(Continued)

*Primary Examiner*—Meng-Ai An
*Assistant Examiner*—Diem K Cao
(74) *Attorney, Agent, or Firm*—Brundidge & Stanger, P.C.

(57) ABSTRACT

A method and its system for acquiring object reference information from a naming service. When executing an object, a retrieval request, which includes the object name of the object, is sent to a computer for providing the naming service. Next, the object is executed on the basis of object reference information acquired as the response to this retrieval request. Moreover, when executing the object, it is judged whether or not the object reference information on the object has been stored in a reference-information storage area into which the acquired object reference information is stored. Furthermore, if the object reference information has been stored therein, an execution request is sent which is implemented for executing the object on the basis of the stored object reference information.

8 Claims, 14 Drawing Sheets

U.S. PATENT DOCUMENTS

2006/0143239 A1* 6/2006 Battat et al. ............... 707/201

FOREIGN PATENT DOCUMENTS

| JP | 08030455 | 2/1996 |
| JP | 11312151 | 11/1999 |
| JP | 2000215179 | 8/2000 |
| JP | 2001515622 | 9/2001 |
| JP | 2002082922 | 3/2002 |

OTHER PUBLICATIONS

Sandholm et al, Design of Object Caching in a CORBA OTM System, Springer-Verlag Berlin Heidelberg, 1999, pp. 241-254.*

Chockler et al, Implementing a Caching Service for Distributed CORBA Objects, Springer-Verlag Berlin Heidelberg, 2000, pp. 1-23.*

Eberhard et al, Efficient Object Caching for Distributed Java RMI Applications, Springer-Verlag Berlin Heidelberg, 2001, p. 15-35.*

Tari et al, Fundamentals of Distributed Object Systems, John Wiley & Son, Inc., Feb. 2001, chapters 6 and 7.*

Bortvedt, Functional Specification for Object Caching Service for Java (OCS4J), 2.0, 2001, pp. 1-27.*

2000, http://www.weblogic.com/docs51/classdocs/API_rmi_iiop.html.

2003, http://www.javaworld.com/javaworld/jw-12-1999/jw-12-iiop.html.

1995-2003, http://java.sun.com/j2ee/ja/overview3.html.

1995-2003, http://developer.java.sun.com/developer/technicalArticles/ebeans/corba.

2003, http://www.javaworld.com/javaworld/jw-04-2002/jw-0419-jndi.html.

* cited by examiner

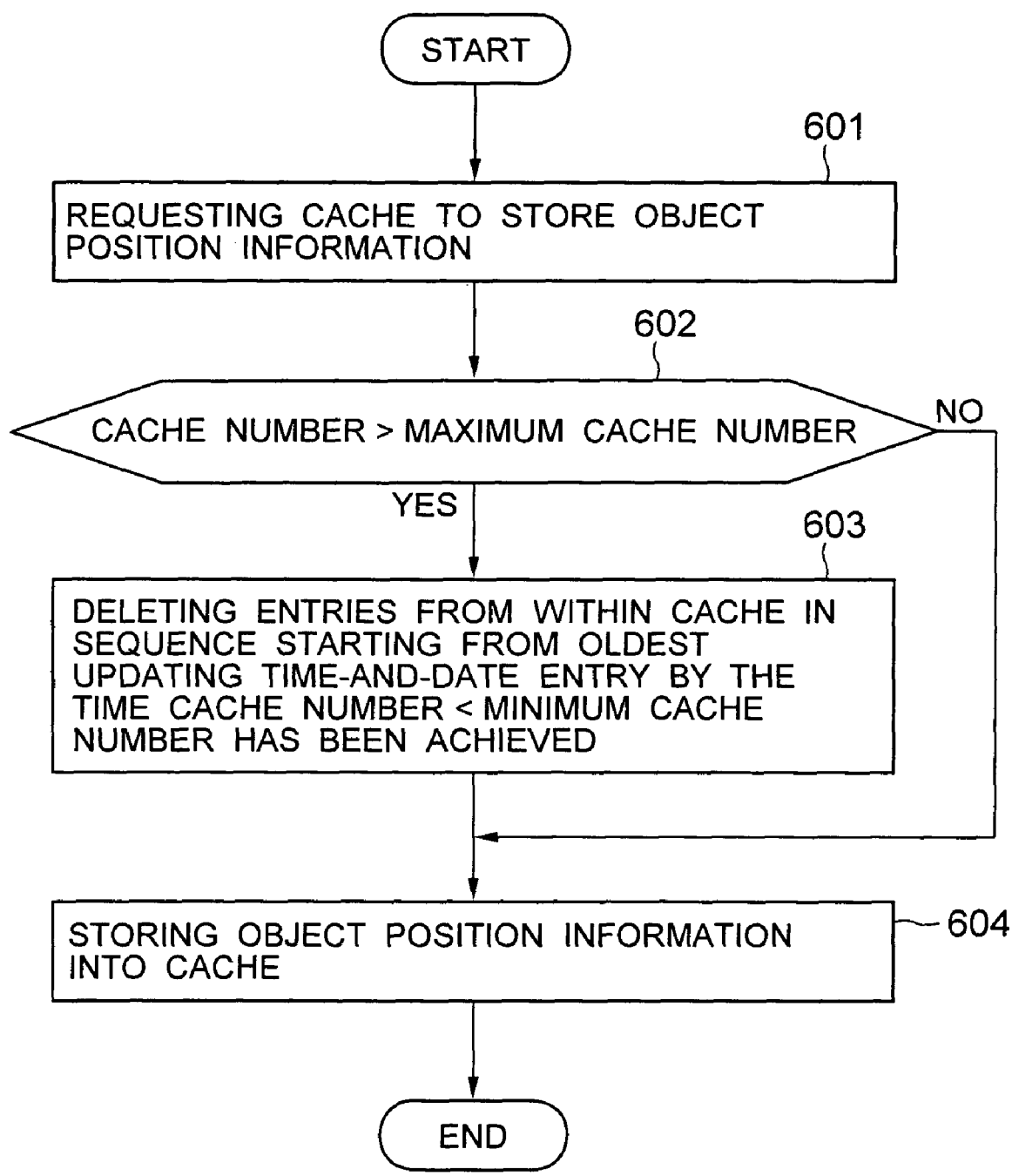

FIG. 14

| | OBJECT NAME | OBJECT POSITION INFORMATION | UPDATING TIME-AND-DATE | |
|---|---|---|---|---|
| (1) LOCAL CACHE 131 ON COMPUTER 100 | COMPUTER 1 / CONTAINER / 01 | Reference1 | 2002/5/8/22:37:023 JST | ~4001 |
| | COMPUTER 1 / CONTAINER / 02 | Reference2 | 2002/5/8/22:43:001 JST | ~4002 |
| | COMPUTER 1 / CONTAINER / 03 | Reference3 | 2002/5/8/21:42:007 JST | ~4003 |

| | OBJECT NAME | OBJECT POSITION INFORMATION | UPDATING TIME-AND-DATE | |
|---|---|---|---|---|
| (2) GLOBAL CACHE 132 ON COMPUTER 100 | COMPUTER 2 / CONTAINER / 04 | Reference4 | 2002/5/8/23:11:132 JST | ~4004 |
| | COMPUTER 2 / CONTAINER / 05 | Reference5 | 2002/5/8/23:59:476 JST | ~4005 |
| | COMPUTER 2 / CONTAINER / 06 | Reference6 | 2002/5/8/22:49:043 JST | ~4006 |

| | REGISTRATION NAME | OBJECT POSITION INFORMATION | |
|---|---|---|---|
| (3) GLOBAL CACHE 132 ON COMPUTER 100 IN CASE OF HAVING STORED OBJECT-NAME-ATTACHED REFERENCE INFORMATION | COMPUTER 2 / CONTAINER / 04 | Reference4:name | ~4007 |
| | COMPUTER 2 / CONTAINER / 05 | Reference5:name | ~4008 |
| | COMPUTER 2 / CONTAINER / 06 | Reference6:name | ~4009 |

DISTRIBUTED OBJECT CONTROLLING METHOD AND ITS CARRYING OUT SYSTEM

BACKGROUND OF THE INVENTION

1. Field of the Invention

The present invention relates to a technology for acquiring object reference information registered in a naming service.

2. Description of the Related Art

When calling up an object, it becomes necessary to know where the object to be called up exists. As one of the methods for acquiring information on a location at which the object exists or the like, as disclosed at http://www.omg.org, there exists a method of utilizing a naming service. Incidentally, basically the same technology has been disclosed in ≦http://www.iona.com/support/docs/manuals/orbix/32/html/orbix-names33-pguide/LoadBalancingC++.html≧ as well.

Conventionally, every time an object is called up, the retrieval to a naming service has occurred. Here, the retrieval to the naming service causes communications therefor to occur. Accordingly, there exists a problem of necessitating a time for the retrieval. Also, when requesting the object to perform a processing by taking advantage of a retrieval result from the naming service, communications therefor occur. Consequently, there also exists a problem of necessitating a time for the processing.

SUMMARY OF THE INVENTION

It is an object of the present invention to shorten the processing time for an object call-up by reducing the number of communications that occur at the time of the retrieval.

It is another object of the present invention to reduce a load onto the naming service by reducing the number of the communications that occur at the time of the retrieval.

It is still another object of the present invention to reduce communications that occur when making a processing request to an object that exists within an identical process.

The naming service stores therein object names and object reference information. In the present invention, the object names, which refer to logical names of objects to be registered, are names for uniquely identifying the objects in a system. Also, each of the object reference information, which is an identifier for specifying the existence location of each object resource, is indicated by a combination of an IP address, a port number, a URL, and the like. According to the information disclosed at ≦http://www.omg.org≧, the object reference information is also referred to as "object reference". In the present invention, a combination of each object name, each object reference information, and the like is referred to as "each entry". Each entry can be retrieved and acquired using the corresponding object name. Usually, the naming service performs the retrieval using the object name as the key, thereby acquiring the object reference information corresponding thereto. Then, taking advantage of this information, the object is requested to perform a processing. This processing request to the object causes communications therefor to occur.

In order to accomplish the above-described objects, in the present invention, the object names and the object reference information are stored into the naming service and cache units inside computers. The computers in the present invention are logical units. In an actual environment, however, plural computers exist within one machine in some cases. A cache unit is divided into 2 parts, i.e., a local cache and a global cache. The local cache stores the object name and the object reference information of an object that exists on a computer identical to the one on which the local cache exists. Also, the global cache stores those of an object that exists on a computer different from the one on which the global cache exists.

When an object calls up another object, with respect to a cache control unit that exists in a naming interface unit, the object notifies the object name of another object to be called up. Then, the object requests the cache control unit to retrieve the object reference information. Moreover, the cache control unit retrieves the object reference information in a sequence of the local cache, the global cache, and the naming service.

If another object to be called up exists on a computer which is identical to the one on which the retrieval requesting-source object exists, the object reference information can be acquired from the local cache. The local cache exists on the computer identical to the one on which the retrieval requesting-source object exists. This condition makes it possible to perform the retrieval of the object reference information without causing communications therefor to occur. Also, the object reference information acquired from the local cache refers to another object that exists on the above-described identical computer. This condition makes it possible to request another object to perform a processing without causing communications therefor to occur.

Meanwhile, if another object to be called up exists on another computer which is different from the one on which the retrieval requesting-source object exists, and also if another object has been already called up one time, the object reference information can be acquired from the global cache. The global cache exists on the computer identical to the one on which the retrieval requesting-source object exists. This condition makes it possible to perform the retrieval of the object reference information without causing communications therefor to occur.

Carrying out the present invention results in the following characteristics: The retrieval to the naming service is executed only when an object that exists on a different computer is called up for the first time. Also, with respect to a processing request made between objects that exist on an identical computer, there occurs none of communications therefor.

BRIEF DESCRIPTION OF THE DRAWINGS

FIG. 13 is a flowchart for deleting a cache entry that has exceeded the cache size; and FIG. 14 illustrates tables for indicating the state of a local cache 131 and that of a global cache 132 in a computer 100.

DESCRIPTION OF THE EMBODIMENTS

Figure 1:
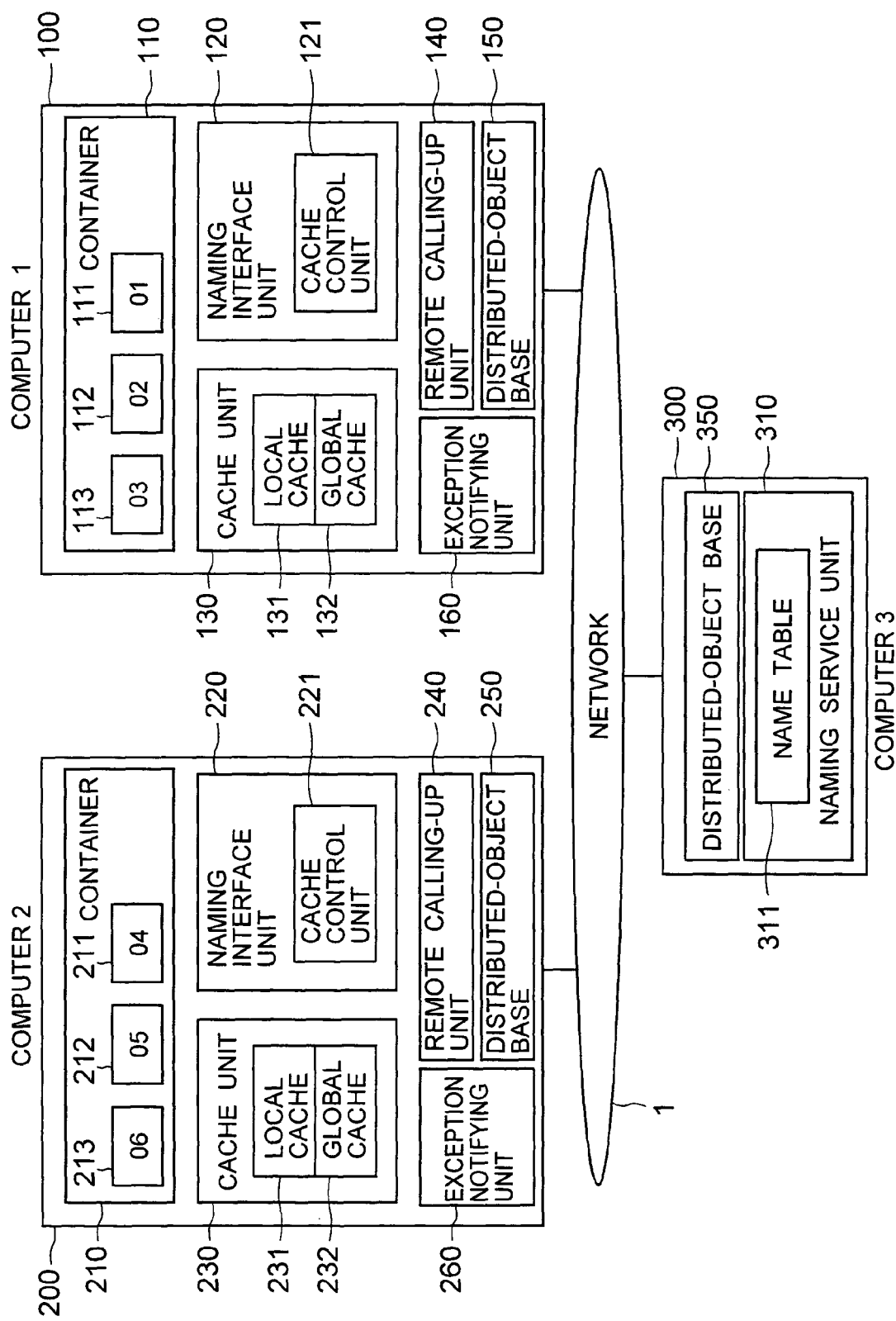
FIG. 1 is a diagram for illustrating the entire configuration of a system which is an embodiment in the present invention.

Hereinafter, the explanation will be given below concerning embodiments of the present invention. FIG. 1 illustrates an embodiment of the distributed object system in the present invention. The present embodiment is the system implemented by a computer 100, a computer 200, and a computer 300 connected to each other via a network 1.

The computer 100 includes a container 110 for providing the execution environment of an object, a naming interface unit 120, a cache unit 130, a remote calling-up unit 140, a distributed-object base 150, and an exception notifying unit 160. Moreover, the container 110 locates therein an object 111, an object 112, and an object 113. A cache control unit 121 exists in the naming interface unit 120. Also, the cache unit 130 is divided into 2 parts, i.e., a local cache 131 and a global cache 132. The local cache 131 stores therein information on an object existing inside a process. Also, the global cache 132 stores therein information on an object existing outside the process.

The computer 200 includes a container 210 for providing the execution environment of an object, a naming interface unit 220, a cache unit 230, a remote calling-up unit 240, a distributed-object base 250, and an exception notifying unit 260. Moreover, the container 210 locates therein an object 211, an object 212, and an object 213. A cache control unit 221 exists in the naming interface unit 220. Also, the cache unit 230 is divided into 2 parts, i.e., a local cache 231 and a global cache 232.

The computer 300 locates therein a naming service unit 310 and a distributed-object base 350. A name table 311 exists in the naming service unit 310. Hereinafter, the brief explanation will be given below regarding the respective units.

Each container (110, 210) provides the execution environment of an object. Each object (111, 112, 113, 211, 212, 213) executes a processing requested thereto. Each naming interface unit (120, 220) is an interface used when accessing the naming service unit 310. Each cache unit (130, 230) stores the object name and the object reference information of a notified object. Each cache unit is divided into each local cache and each global cache. Each remote calling-up unit (140, 240) is of a communication layer for sending a request to a remote object. As a publicly-known example, there exists a technology indicated at ≦http://java.sun.com≧. The present embodiment has used functions based thereon. Each distributed-object base unit (150, 250, 350) is of a communication layer for sending a request to a distributed object. The technology disclosed at ≦http://java.sun.com≧ has been applied with no change added thereto.

Each exception notifying unit (160, 260) acquires an exception, thereby performing the execution of an exception processing and an exception notification. Each cache control unit (121, 221) performs a registration and a deletion with respect to each cache unit (130, 230). Each local cache (131, 231) stores the object names, the object reference information, and the updating times-and-dates on the identical computer. Each global cache (132, 232) stores the object names, the object reference information, and the updating times-and-dates on the different computer. The naming service unit (310), using a notified object name as the key, retrieves the object reference information from the name table (311), and stores the notified object name and the object reference information. The name table (311) stores the object names and the object reference information of the objects on the system.

Hereinafter, the brief explanation will be given below regarding an object call-up in the case of utilizing the naming service unit 310, an object call-up in the case of utilizing each global cache, and an object call-up in the case of utilizing each local cache.

The name table 311 in the naming service unit 310 has stored the object names and the object reference information existing on the system. The storage into the name table is performed by receiving the object name and the object reference information from an object when the object is started up. When an object calls up another object, the object notifies the object name of another object to the naming service unit 310, thereby making an inquiry about the object reference information corresponding to the object name. The naming service unit 310, using the received object name as the key, performs the retrieval to the name table, then notifying the object reference information retrieved.

In the object call-up that utilizes the naming service unit 310, the inquiry to the naming service occurs every time another object is called up. When another object is called up which exists on the computer different from the computer 100 on which the global cache 132 exists, the object name, the object reference information, and the updating time-and-date of another object called up are stored into the global cache 132.

In the call-up from the object 111 on the computer 100 to the object 211 on the computer 200, after the object 211 has been called up for the first time, the object name, the object reference information, and the updating time-and-date of the object 211 are stored into the global cache 132. Then, when the object 111 calls up the object 211 once again, the object 111 notifies the object name of the object 211 to the global cache 132, thereby receiving the object reference information on the object 211. Next, using the object reference information that the object 111 has received, the object 111 requests the object 211 to perform a processing. Even if the same object is called up plural times, the utilization of the global cache permits the inquiry to the naming service to occur only one time.

When an object is started up which exists on the computer 100 on which the local cache 131 exists, the object name, the object reference information, and the updating time-and-date of the object are stored into the local cache 131. Then, when the object 111 calls up the object 112, the object 111 notifies, to the local cache 131, the object name of the object 112 to be called up, thereby acquiring the corresponding object reference information. The object referred to by the object reference information stored in the local cache 131 exists on the computer which is identical to the one on which the object 111 exists. This condition makes it possible to call up the object without causing communications to occur which are supposed to be connected to the remote calling-up unit 140 or the distributed-object base unit 150. The utilization of the local cache makes it possible to reduce communications for the inquiry to the naming service and communications for the call-up.

Figure 2:
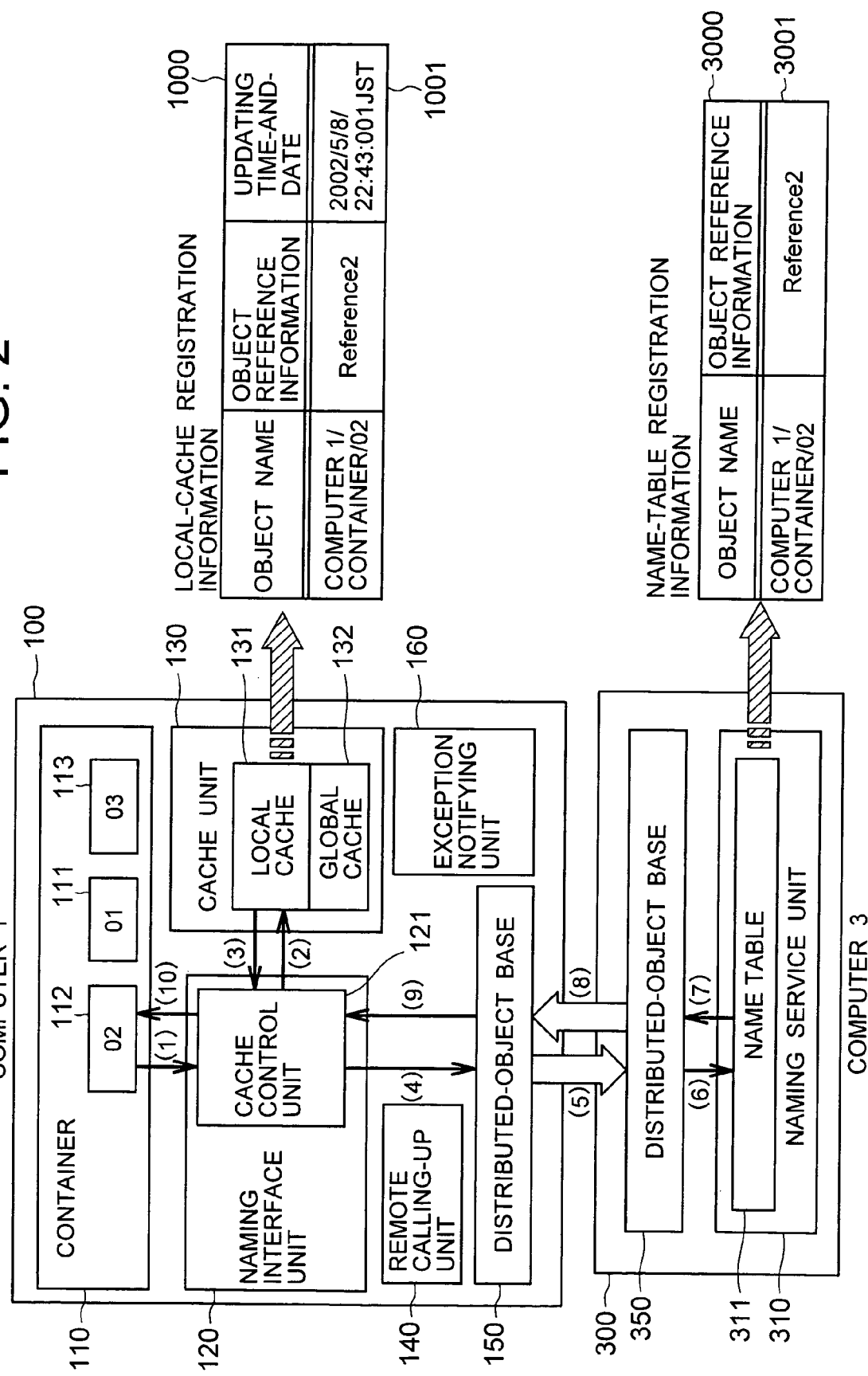
FIG. 2 is a diagram for illustrating a method for storing, into a local cache, the object name, the object reference information, and the updating time-and-date of an object 112.

Referring to FIG. 2, the explanation will be given below concerning the flow of the object registration into the local cache, using the object 112 on the computer 100.

(1) The object 112, when the object 112 itself is started up, notifies the object name (i.e., computer 1/container/02) and the object reference information (i.e., Reference 2) to the cache control unit 121 in the naming interface unit 120, thereby requesting the unit 121 to store the object name and the object reference information into the naming service unit 310 and the local cache 131.

(2) The cache control unit 121 requests the local cache 131 to store the object name (computer 1/container/02) and the object reference information (Reference 2) received from the object 112.

(3) After having terminated the storage, the local cache 131 notifies the termination to the cache control unit 121.

(4) The cache control unit 121 notifies, to the distributed-object base 150, the object name (computer 1/container/02) and the object reference information (Reference 2) received from the object 112, then requesting the base 150 to store the object name and the object reference information into the naming service unit 310.

(5) The distributed-object base 150 causes a communication to occur, thereby notifying the received object name (computer 1/container/02) and object reference information (Reference 2) to the distributed-object base 350 in the computer 300. Then, the base 150 requests the base 350 to store the object name and object reference information into the naming service unit 310.

(6) The distributed-object base 350 in the computer 300 stores the received object name (computer 1/container/02) and object reference information (Reference 2) into the name table 311 that exists in the naming service unit 310. The result of this registration turns out to be a one as indicated by a column 3001 on a table 3000.

(7) The naming service unit 310 notifies, to the distributed-object base 350, a return code for notifying the termination.

(8) The distributed-object base 350 causes a communication to occur, thereby notifying the received return code to the distributed-object base 150.

(9) The distributed-object base 150 notifies the received return code to the cache control unit 121.

(10) The cache control unit 121 notifies the received return code to the object 112.

Figure 3:
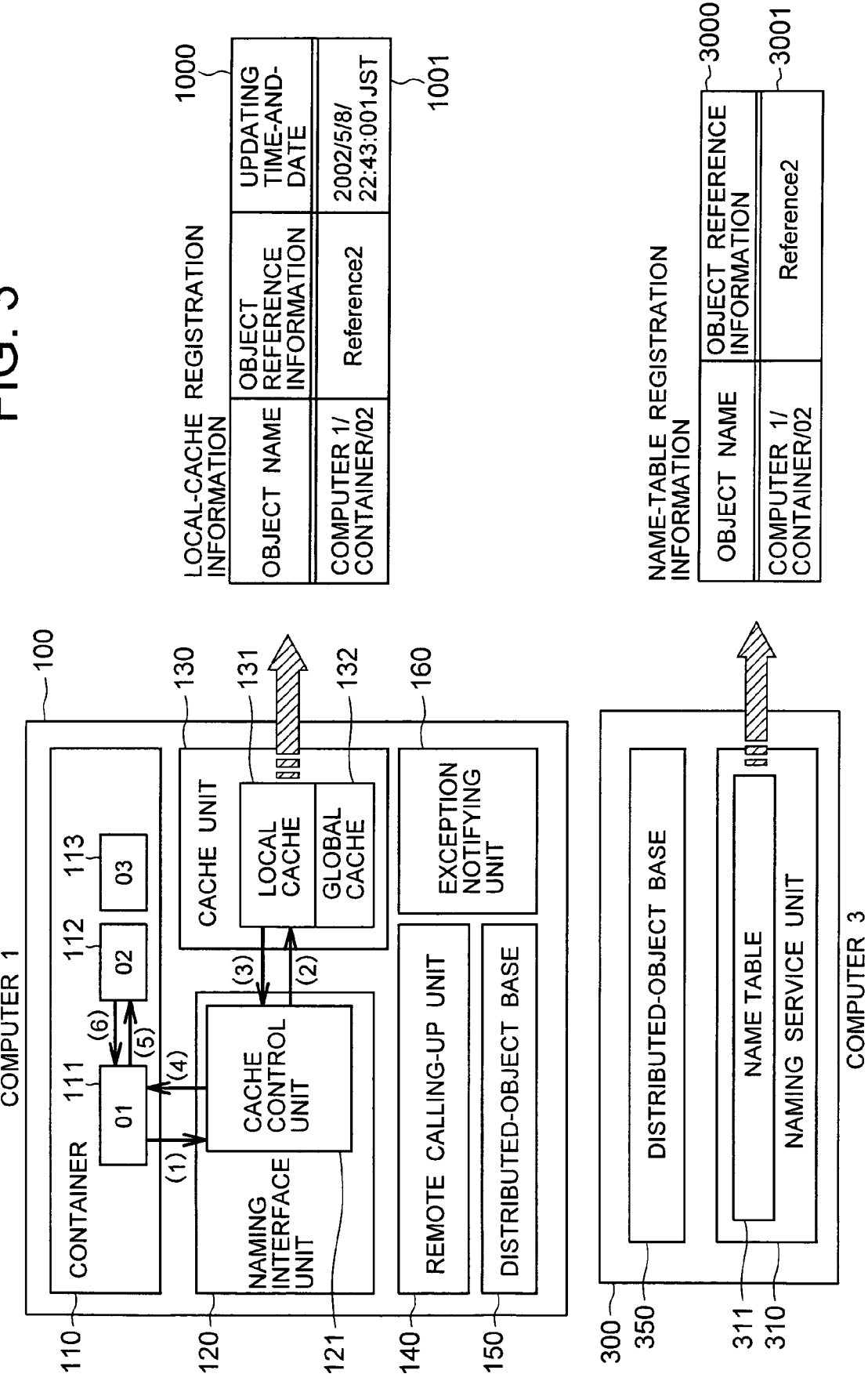
FIG. 3 is a diagram for illustrating a call-up of the object 112 from an object 111 by taking advantage of the local cache.

Referring to FIG. 3 which illustrates the example where the object 111 accesses the object 112, the explanation will be given below concerning the flow of the object using the registration information registered into the local cache 131.

(1) The object 111 notifies the object name (i.e., computer 1/container/02) of the object 112 to the cache control unit 121, then making an inquiry about the object reference information on the object 112.

(2) The cache control unit 121 notifies the received object name (computer 1/container/02) to the local cache 131, then making the inquiry about the object reference information on the object 112.

(3) The local cache 131 notifies the inquiry result, i.e., the object reference information (i.e., Reference 2), to the cache control unit 121.

(4) The cache control unit 121 notifies the received object reference information (Reference 2) to the object 111.

(5) The object 111, using the received object reference information (Reference 2), calls up the object 112, then requesting the object 112 to perform a processing.

(6) The object 112 notifies the processing result to the object 111.

The utilization of the local cache allows the object reference information to be acquired without making the inquiry to the naming service. This prevents communications therefor from occurring at the time of the inquiry to the naming service.

Also, in the object call-up that utilizes the object reference information stored in the naming service unit 310, the communications therefor occur. It has been recognized, however, that the object referred to by the object reference information stored in the local cache exists on the computer identical to the one on which the call-up side object exists. This condition makes it possible to call up the object without causing the communications therefor to occur.

The utilization of the local cache makes it possible to reduce the communications that occur at the time of the inquiry to the naming service, and the communications that occur at the time of the object call-up.

Figure 4:
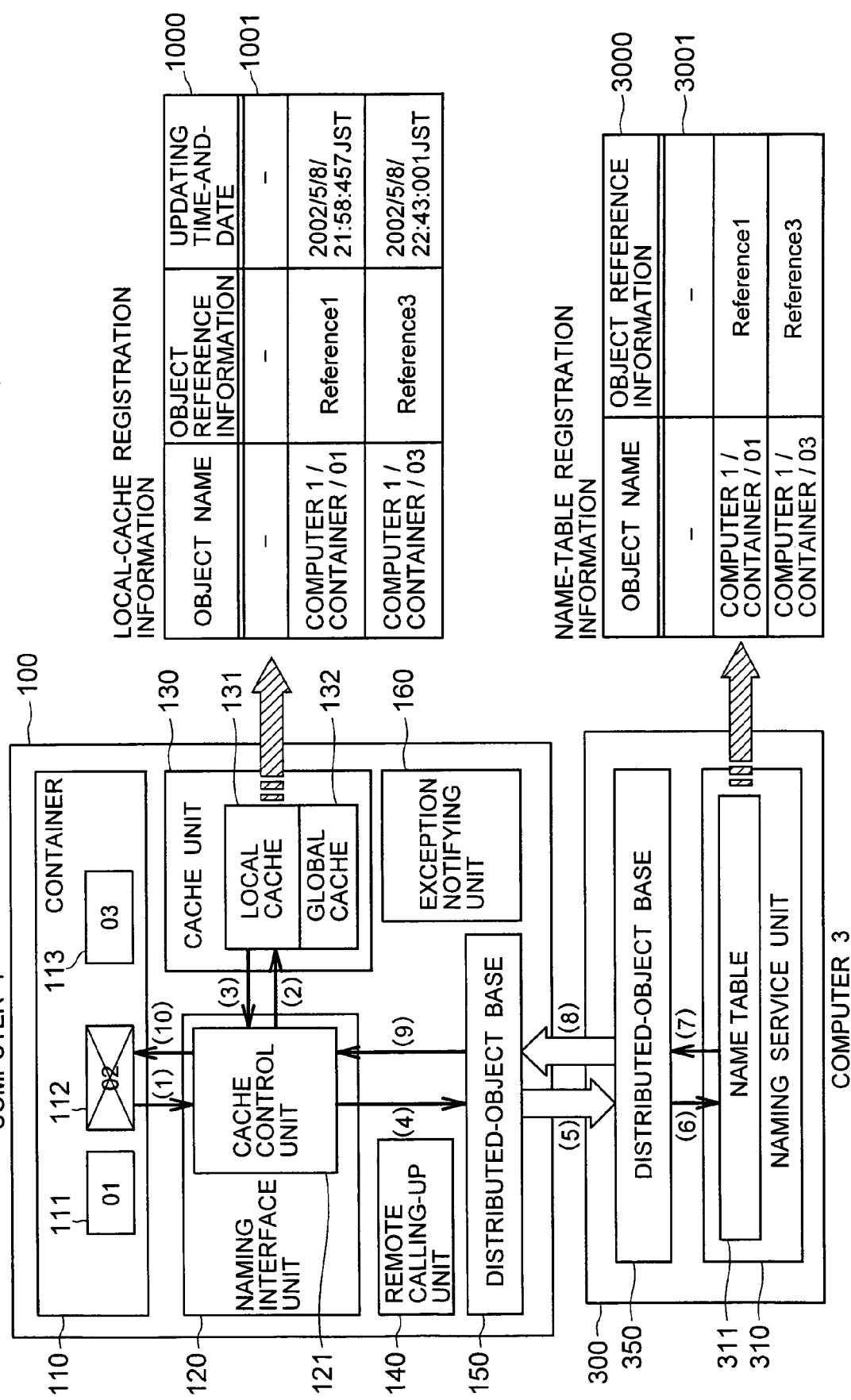
FIG. 4 is a diagram for illustrating a method for deleting, from the local cache, the object name, the object reference information, and the updating time-and-date of the object 112.

Using FIG. 4 which illustrates an embodiment of deleting the object 112, the explanation will be given below regarding the deletion of an entry in the local cache 131. Incidentally, it is assumed that the object 111, the object 112, and the object 113 had been already started up and have been stored into the local cache 131 and the name table 311. FIG. 14 (1) illustrates the after-storage local cache 131.

(1) The object 112, when the object 112 itself is stopped, notifies the object name (i.e., computer 1/container/02) to the cache control unit 121, thereby requesting the unit 121 to delete, from within the local cache 131, an entry corresponding to the object name.

(2) The cache control unit 121 notifies the received object name (computer 1/container/02) to the local cache 131, then requesting the cache 131 to delete the corresponding entry.

(3) Having deleted the entry corresponding to the received object name (computer 1/container/02), the local cache 131 notifies the termination of the deletion to the cache control unit 121. The after-deletion local cache 131 turns out to be a one as indicated by a table 1000.

(4) The cache control unit 121 notifies, to the distributed-object base 150, the object name (computer 1/container/02) received from the object 112, then requesting the base 150 to delete the corresponding entry from within the name table 311.

(5) The distributed-object base 150 causes a communication to occur, thereby notifying the received object name (computer 1/container/02) to the distributed-object base 350. Then, the base 150 requests the base 350 to delete the corresponding entry from within the name table 311.

(6) The distributed-object base 350 requests the naming service unit 310 to delete, from within the name table 311, the entry corresponding to the received object name (computer 1/container/02). The after-deletion name table 311 turns out to be a one as indicated by a table 3000.

(7) The naming service unit 310 notifies, to the distributed-object base 350, a return code for notifying the termination.

(8) The distributed-object base 350 causes a communication to occur, thereby notifying the received return code to the distributed-object base 150.

(9) The distributed-object base 150 notifies the received return code to the cache control unit 121.

(10) The cache control unit 121 notifies the received return code to the object 112.

Figure 5:
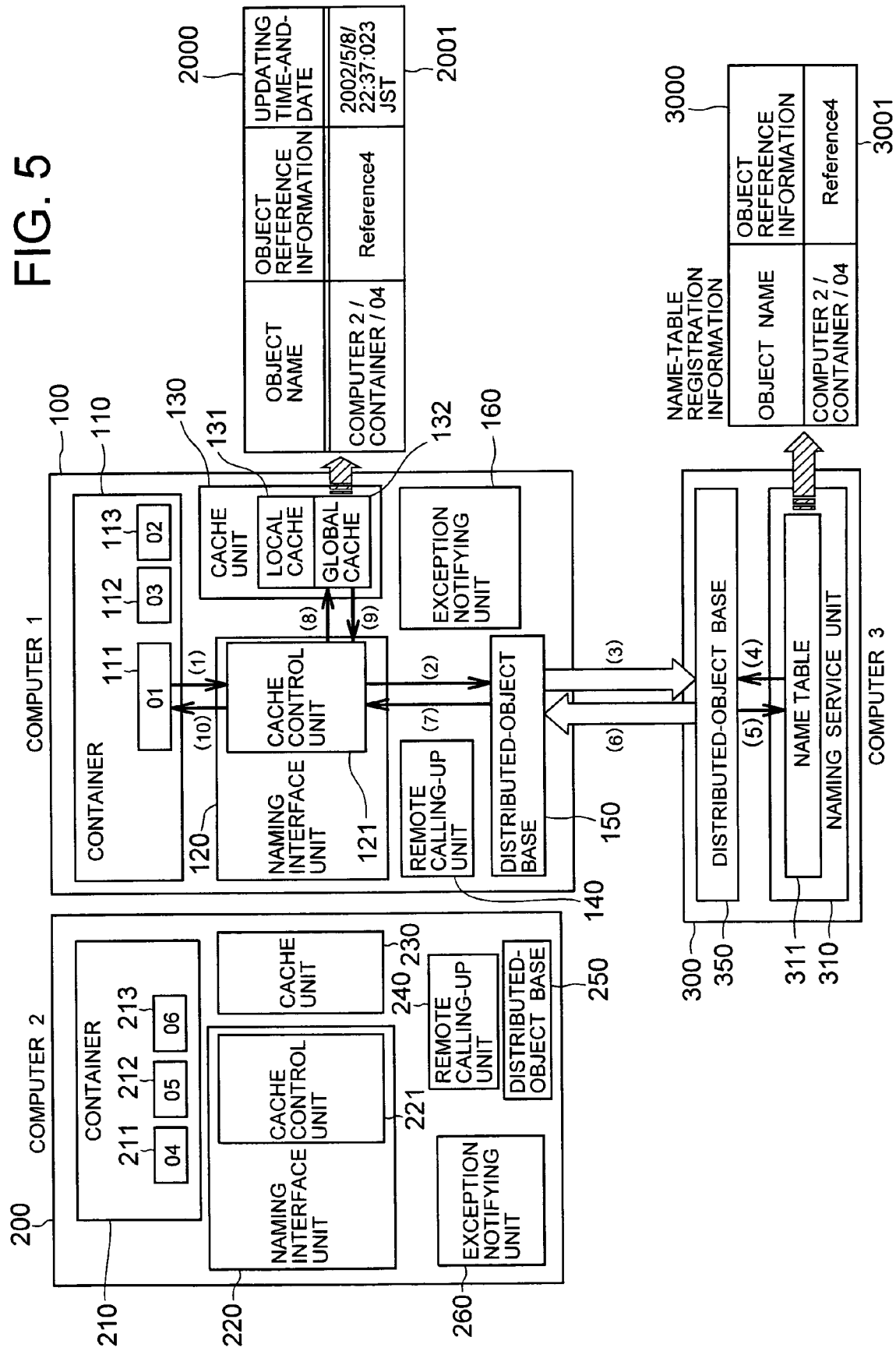
FIG. 5 is a diagram for illustrating a method for storing, into a global cache, the object name, the object reference information, and the updating time-and-date of an object 212.
Figure 6:
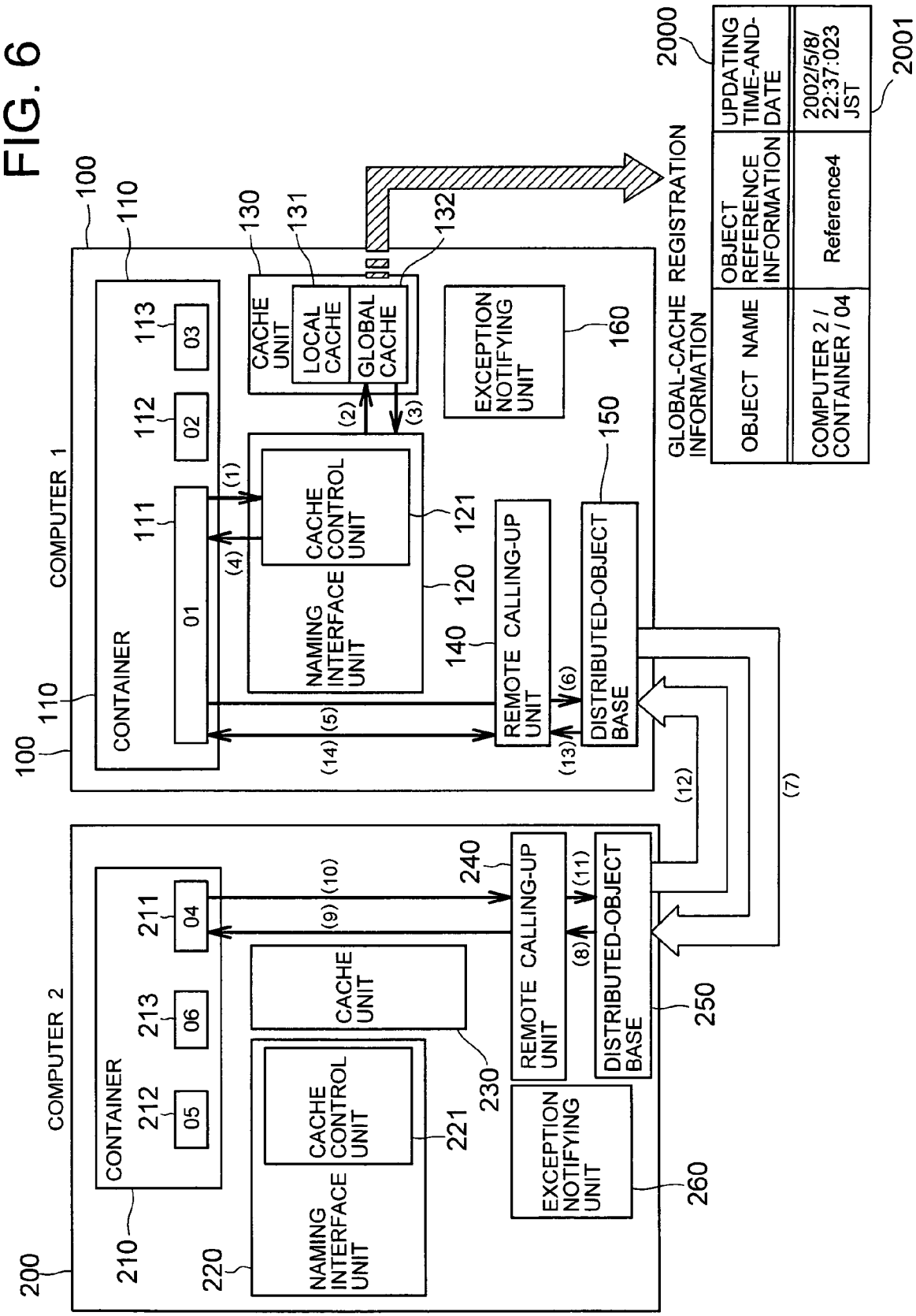
FIG. 6 is a diagram for illustrating a method for calling up an object 211 from the object 111 by taking advantage of the global cache.

Referring to FIG. 5, the explanation will be given below regarding the object registration into the global cache 132. The global cache 132 stores therein an object acquired from the name table 311 in the naming service unit 310. The storage into the global cache 132 is executed when no target object has been stored in the local cache 131 and the global cache 132.

Hereinafter, using an example where the object 111 accesses the object 211 for the first time, the explanation will be given below regarding the object registration into the global cache 132. In this case, it is assumed that none of the information on the object 211 has been stored in the local cache 131 and the global cache 132.

(1) The object 111 notifies the object name (i.e., computer 2/container/04) of the object 211 to the cache control unit 121, then making an inquiry about the object reference information on the object 211.

(2) None of the information on the object 211 has been stored in the local cache 131 and the global cache 132. Accordingly, the cache control unit 121 notifies the object name (computer 2/container/04) to the distributed-object base 150, thereby requesting the base 150 to retrieve the object reference information.

(3) The distributed-object base 150 causes a communication to occur, thereby notifying the received object name (computer 2/container/04) to the distributed-object base 350 in the computer 300 so as to make the inquiry about the object reference information.

(4) The distributed-object base 350 notifies the received object name (computer 2/container/04) to the naming service unit 310, then making the inquiry about the object reference information.

(5) The naming service unit 310, using the received object name (computer 2/container/04), retrieves the object reference information on the object 211 from the name table 311, then notifying a retrieval result (i.e., Reference 4) to the distributed-object base 350.

(6) The distributed-object base 350 causes a communication to occur, thereby notifying the received retrieval result (Reference 4) to the distributed-object base 150.

(7) The distributed-object base 150 notifies the received retrieval result (Reference 4) to the cache control unit 121.

(8) The cache control unit 121 requests the global cache 132 to store therein the received retrieval result (Reference 4) and the object name (computer 2/container/04) notified from the object 111.

(9) Having stored the object name (computer 2/container/04), the retrieval result (Reference 4), and the updating time-and-date thus received, the global cache 132 notifies the termination to the cache control unit 121. The result of this storage turns out to be a one as indicated by a column 2001 on a table 2000.

(10) The cache control unit 121 notifies the received retrieval result (Reference 4) to the object 111.

Referring to FIG. 3 which illustrates the example where the object 111 accesses the object 112, the explanation will be given below concerning the flow of the object using the registration information registered into the global cache 132.

(1) The object 111 notifies the object (i.e., complputer 2/container/04) of the object 211 to the cache control unit 121, then the making an inquiry about the object reference information on the object 211.

(2) None of the object reference information on the object 211 has been stored in the local cache 131. Accordingly, the cache control unit 121 notifies the object name (complputer 2/container/04) to the global cache 132, then making the inquiry about the object reference information on the object 211.

(3) The global cache 132 notifies the inquiry result, i.e., the object reference information (i.e., Reference 4), to the cache control unit 121.

(4) The cache control unit 121 notifies the received object reference (Reference 4) to the object 111.

(5) Using the received object reference information (Reference 4), the object 111 notifies, to the remote calling-up unit 140, a processing request made to the object 211.

(6) The remote calling-up unit 140 notifies, to the distributed-object base 150, the processing request made to the object 211.

(7) The distributed-object base 150 causes a communication to occur, thereby notifying, to the distributed-object base 250, the processing request made to the object 211.

(8) The distributed-object base 250 notifies, to the remote calling-up unit 240, the processing request made to the object 211.

(9) The remote calling-up unit 140 notifies, to the object 211, the processing request made to the object 211.

(10) The object 211 performs the processing request, then notifies the processing result to the remote calling-up unit 240.

(11) The remote calling-up unit 240 notifies the processing result to the distributed-object base 250.

(12) The distributed-object base 250 causes a communication to occur, thereby notifying the processing request to the distributed-object base 150.

(13) The distributed-object base 150 notifies the processing request to the remote calling-up unit 140.

(14) The remote calling-up unit 140 notifies the processing request to the object 111.

At a 2nd-or-thereinafter call-up of one and the same object, the utilization of the global cache 132 allows the object reference information to be acquired without causing communications therefor to occur.

If the object 211 is deleted when the system is under operation, if a communication becomes incapable at the distributed-object base due to occurrence of a network failure, or the like, it is required to delete entries stored in the global cache 132.

Figure 7:
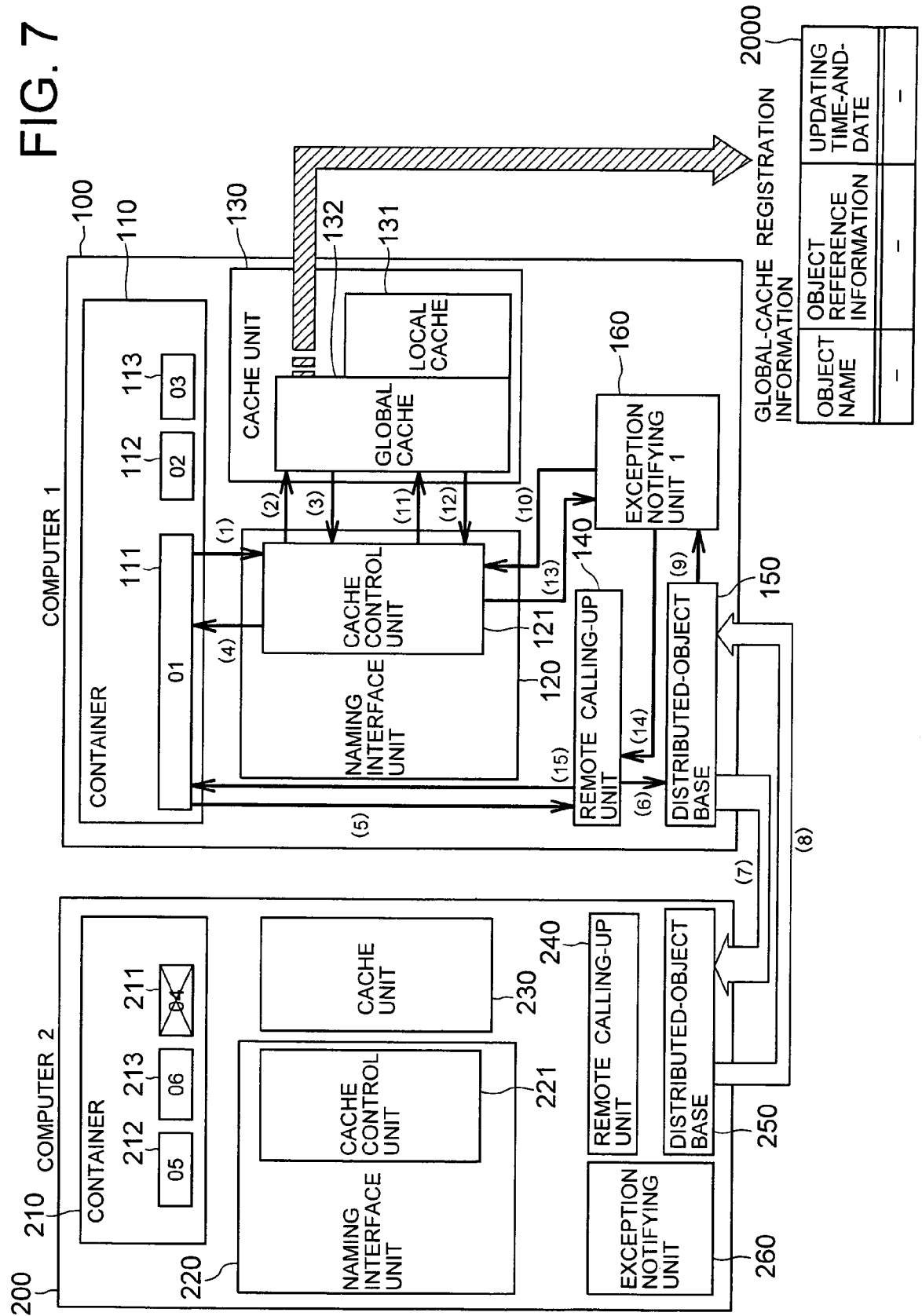
FIG. 7 is a diagram for illustrating a method for deleting the whole entries in the global cache by acquiring a communication exception.

FIG. 7 illustrates an embodiment of deleting the entries in the global cache 132 by utilizing an exception notifying unit 1. Here, it is assumed that the global cache 132 in the computer 100 lies in a state implemented after the objects 211, 212, and 213 have been called up one time. FIG. 14 (2) illustrates the state of the global cache 132 at this time.

At this time, the explanation will be given below selecting, as an example, the case where the object 111 calls up the object 211.

(1) The object 111 notifies the object name (i.e., computer 2/container/04) of the object 211 to the cache control unit 121, then making an inquiry about the object reference information on the object 211.

(2) The cache control unit 121 notifies the object name (computer 2/container/04) to the global cache 132, then making the inquiry about the object reference information on the object 211.

(3) The global cache 132 notifies, to the cache control unit 121, the object reference information (i.e., Reference 4) on the object 211 stored in the global cache 132.

(4) The cache control unit 121 notifies the received object reference information (Reference 4) to the object 111.

(5) Using the received object reference information (Reference 4), the object 111 notifies, to the remote calling-up unit 140, a processing request made to the object 211.

(6) The remote calling-up unit 140 notifies, to the distributed-object base 150, the processing request made to the object 211.

(7) The distributed-object base 150 causes a communication to occur, thereby notifying, to the distributed-object base 250, the processing request made to the object 211. In the distributed-object base 250, a communication exception occurs, because the object 211, which is supposed to carry out the received processing request, is not found out.

(8) The distributed-object base 250 notifies, to the distributed-object base 150, the communication exception that has occurred.

(9) The distributed-object base 150 notifies the notified communication exception to the exception notifying unit 1 in order to convert the communication exception into a manner that is commutable in the remote calling-up unit 140.

(10) The exception notifying unit 1, when notified of the communication exception, requests the cache control unit 121 to delete all the entries in the global cache 132.

(11) The cache control unit 121 requests the global cache 132 to delete all the entries therein.

(12) Having deleted all the entries therein, the global cache 132 notifies the deletion termination to the cache control unit 121.

(13) The cache control unit 121 notifies the received termination notice to the exception notifying unit 1.

(14) Having received the termination notice from the cache control unit 121, the exception notifying unit 1 notifies the received communication exception to the remote calling-up unit 140.

(15) The remote calling-up unit 140 notifies the received communication exception to the object 111, i.e., the calling-up source.

The object notifies the global cache that the communication has become incapable at the distributed-object base. This requirement necessitates implementation of the broadband communication, which is inefficient. Also, a method is considered where, although the global cache is used, it is confirmed whether or not there exists an object corresponding to the object reference information stored in the global cache. This method causes a communication to occur every time the object is called up, which is also inefficient. In the present invention, however, when calling up the object 211, the communication exception is detected and the global cache 132 is deleted. This condition permits the communication to occur only one time.

Figure 8:
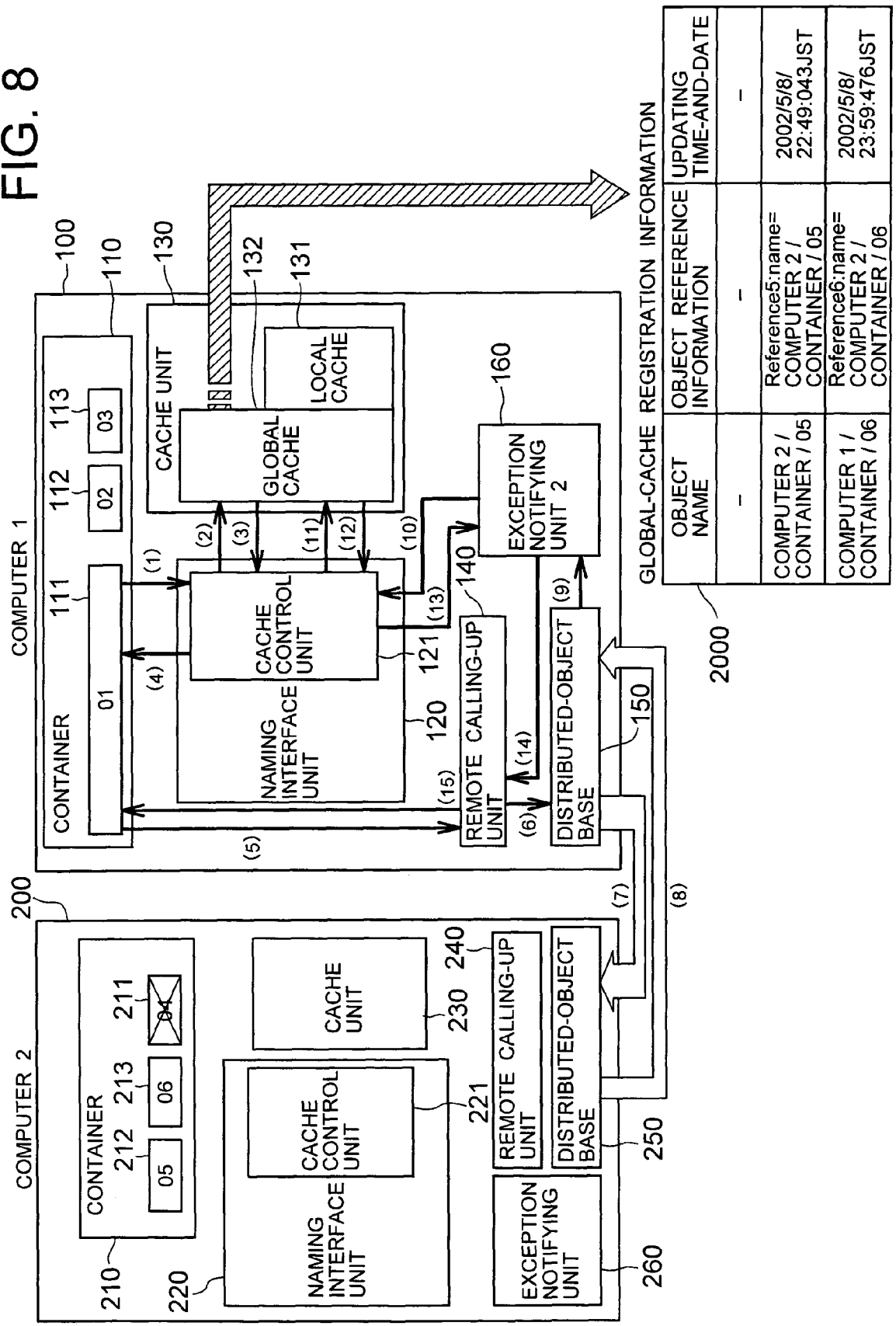
FIG. 8 is a diagram for illustrating a method for deleting a specific entry in the global cache by acquiring the communication exception.

FIG. 8 illustrates an embodiment of deleting the entries in the global cache 132 by utilizing an exception notifying unit 2.

In order to carry out the deletion of the global cache 132 by utilizing the exception notifying unit 2, the object names are included in advance into the object reference information to be stored into the name table 311 and the global cache 132. FIG. 14 (3) illustrates the state of the global cache 132 implemented after the objects 211, 212, and 213 have been called up.

The explanation will be given below selecting, as an example, the case where the object 111 calls up the object 211.

(1) The object 111 notifies the object name (i.e., computer 2/container/04) of the object 211 to the cache control unit 121, then making an inquiry about the object reference information on the object 211.

(2) The cache control unit 121 notifies the object name (computer 2/container/04) to the global cache 132, then making the inquiry about the object reference information on the object 211.

(3) The global cache 132 notifies, to the cache control unit 121, the object reference information (i.e., Reference 4: name=computer 2/container/04) on the object 211 stored in the global cache 132.

(4) The cache control unit 121 notifies the received object reference information (Reference 4: name=computer 2/container/04) to the object 111.

(5) Using the received object reference information (Reference 4: name=computer 2/container/04), the object 111 notifies, to the remote calling-up unit 140, a processing request made to the object 211.

(6) The remote calling-up unit 140 notifies, to the distributed-object base 150, the processing request made to the object 211.

(7) The distributed-object base 150 causes a communication to occur, thereby notifying, to the distributed-object base 250, the processing request made to the object 211. In the distributed-object base 250, a communication exception occurs, because the object 211, which is supposed to carry out the received processing request, is not found out.

(8) The distributed-object base 250 notifies, to the distributed-object base 150, the communication exception that has occurred.

(9) The distributed-object base 150 notifies the notified communication exception to the exception notifying unit 2.

(10) The exception notifying unit 2, when notified of the communication exception, fetches the object name from within the object reference information (Reference 4: name=computer 2/container/04). After that, the unit 2 notifies the fetched object name to the cache control unit 121, then requesting the unit 121 to delete, from within the global cache 132, an entry corresponding to the notified object name.

(11) The cache control unit 121 requests the global cache 132 to delete the entry corresponding to the received object name.

(12) Having deleted the entry corresponding to the received object name, the global cache 132 notifies the termination notice to the cache control unit 121.

(13) The cache control unit 121 notifies the received termination notice to the exception notifying unit 2.

(14) Having received the termination notice from the cache control unit 121, the exception notifying unit 2 notifies the received communication exception to the remote calling-up unit 140.

(15) The remote calling-up unit 140 notifies the received communication exception to the calling-up source object 111.

In the scheme in FIG. 7, it has been not configured as the premise to be able to identify the object name of the object that has caused the exception to occur. Accordingly, all the entries in the global cache have been deleted. In contrast to this, in the scheme in FIG. 8, the object names are included beforehand into the object reference information. Consequently, it becomes possible to delete the specific entry that has caused the exception to occur.

Figure 9:
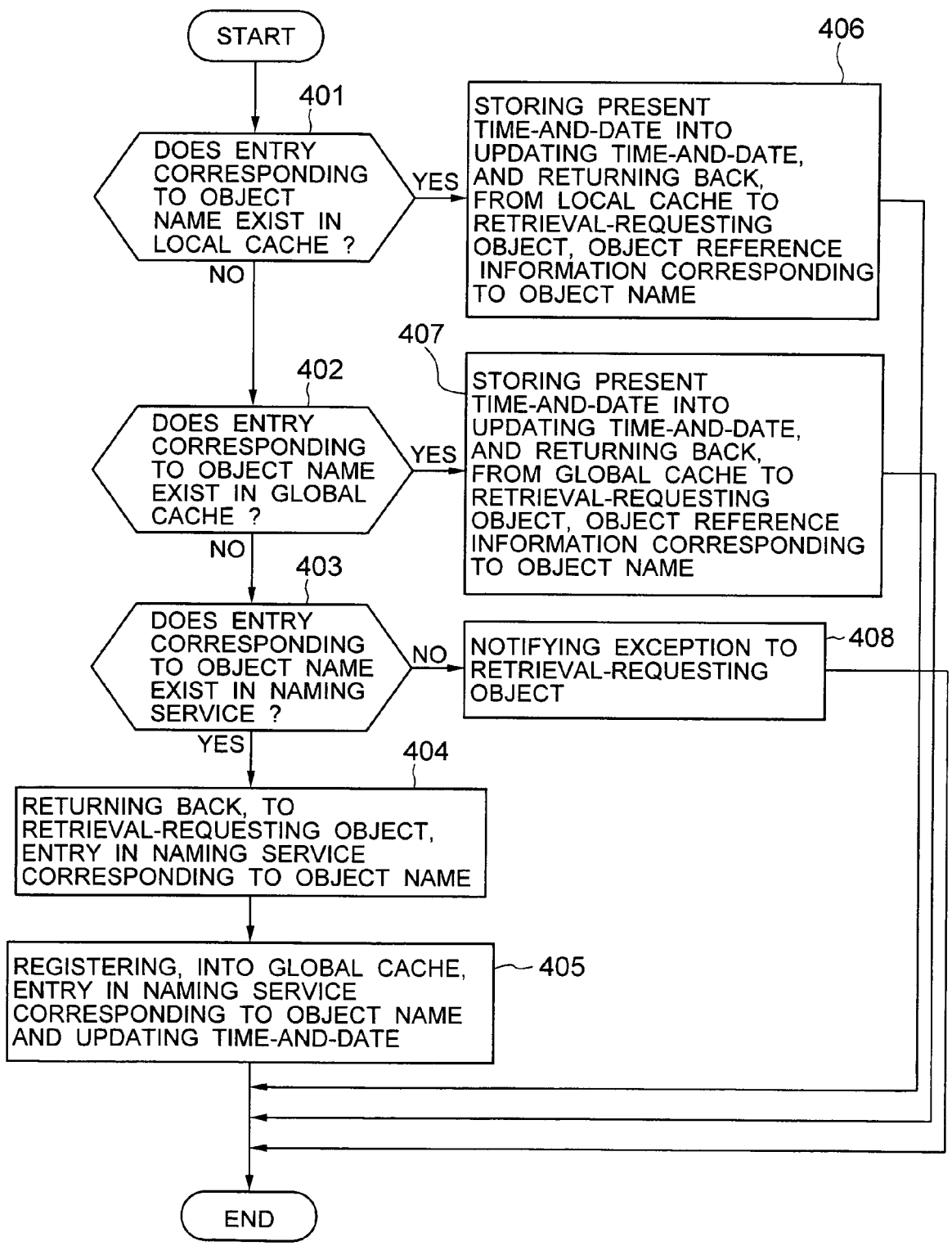
FIG. 9 is a flowchart for indicating a flow for retrieving object position information by using an object name of which a cache control unit has been notified.

FIG. 9 illustrates a flowchart by which each cache control unit (121, 221), when notified of an object name, retrieves the object corresponding to the object name.

It is judged whether or not an entry corresponding to the object name exists in the local cache (step 401). If the entry exists therein, after storing the present time-and-date into the updating time-and-date of the entry corresponding to the object name, the retrieval result, i.e., the object reference information, is returned back to a retrieval-requesting source object, then terminating the retrieval (step 406). If the entry does not exist therein, it is judged whether or not the entry corresponding to the object name exists in the global cache (step 402). If the entry exists therein, after registering the present time-and-date into the updating time-and-date of the entry corresponding to the object name, the retrieval result, i.e., the object reference information, is returned back to the retrieval-requesting source object, then terminating the retrieval (step 407). Meanwhile, if the entry exists neither in the local cache nor in the global cache, it is judged whether or not the entry corresponding to the object name exists in the naming service (step 403). If the entry does not exist therein, an exception is notified to the retrieval-requesting source object (step 408). If the entry exists therein, the retrieval result, i.e., the object reference information, is returned back to the retrieval-requesting source object (step 404). Moreover, the information on the retrieval result is registered into the global cache, then terminating the retrieval (step 405).

Figure 10:
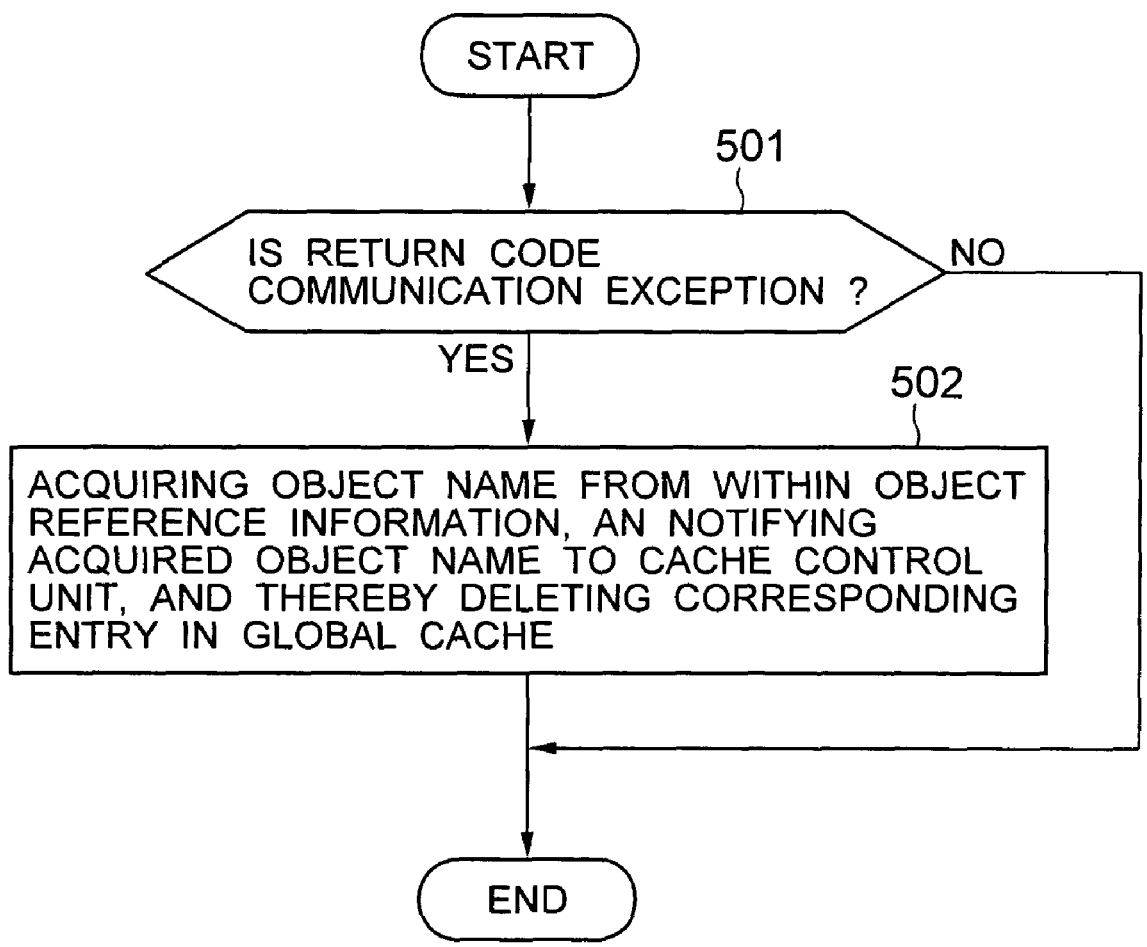
FIG. 10 is a flowchart for deleting the specific entry in the global cache by acquiring the communication exception.

FIG. 10 illustrates a flowchart regarding the deletion of the global cache in the case where the communication exception has occurred in the distributed-object base.

The distributed-object base checks whether or not a return code for notifying the processing result is the communication exception (step 501). If the return code has caused the communication exception to occur, the exception notifying unit acquires the object name from within the object reference information. Next, the exception notifying unit notifies the acquired object name to the cache control unit, thereby deleting an entry corresponding to the acquired object name in the global cache (step 502).

Incidentally, although not indicated in the flowchart, it is also allowable to request the cache control unit to clear the entire cache unit when the cache control unit has been notified of the object name.

Figure 11:
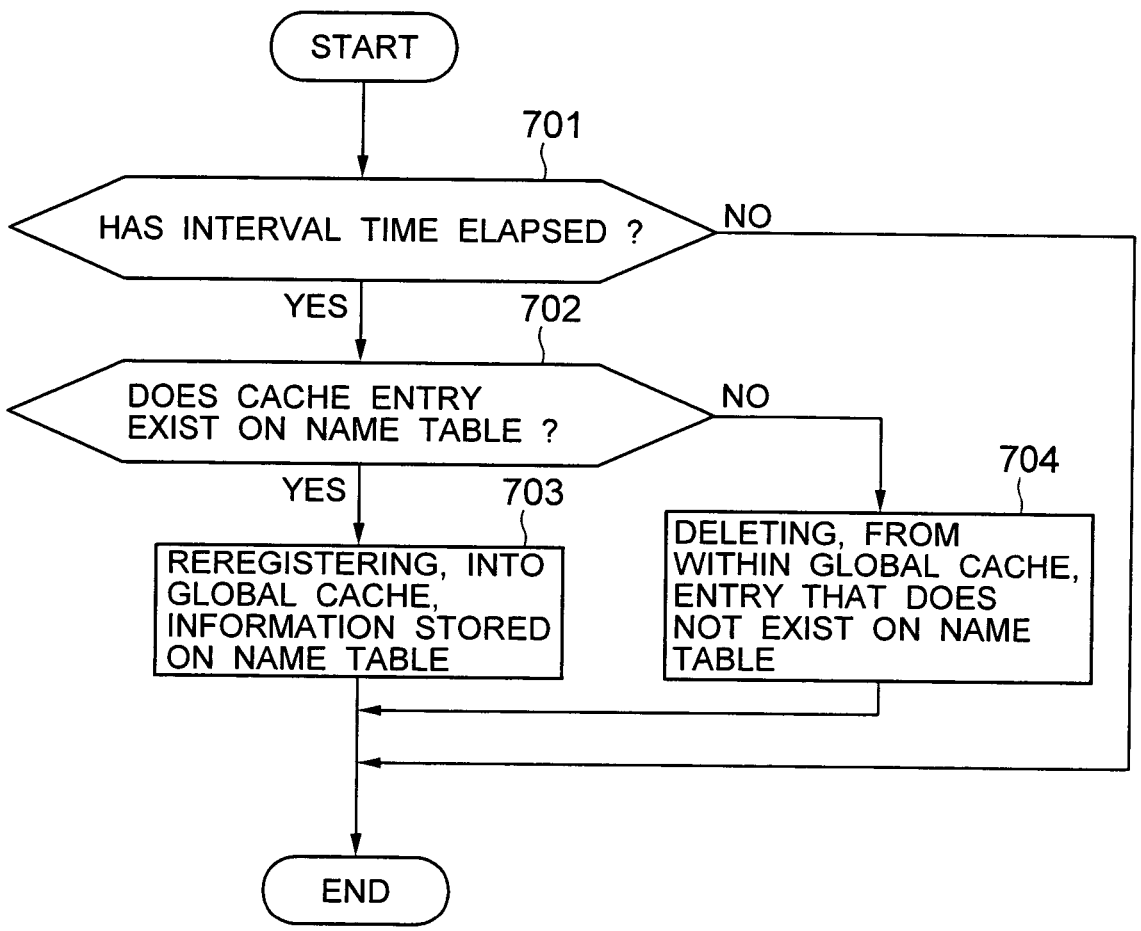
FIG. 11 is a flowchart for making a comparison between the entries in the global cache and the information registered in the naming service unit at a point-in-time when an interval time has elapsed, and for updating the entries in the global cache or deleting an entity therein.

FIG. 11 is a flowchart for making a comparison between the entries in the global cache and the information registered in the naming service unit at a point-in-time when an interval time has elapsed, and for updating the entries in the global cache or deleting an entity therein. At first, it is checked whether or not an interval time has elapsed (step 701). If the interval time has not elapsed, the processing is terminated. Meanwhile, if the interval time has elapsed, it is inquired whether or not all the entries in the global cache exist on the name table (step 702). If all the entries in the global cache exist thereon, all the entries are updated, then terminating the processing (step 703). If all the entries in the global cache do not exist thereon, an entry that does not exist thereon is deleted from within all the entries in the global cache, then terminating the processing (step 704).

Assume that, e.g., the interval time is 30 minutes and the interval starting time-and-date is 2002/05/08/23:30:456 JST. Also, the object 211 on the computer 200 is stopped at 2002/05/08/23:45:006 JST, and the object 213 thereon is started up at 2002/05/08/23:35:040 JST after having been stopped at 2002/05/08/23:31:027 JST. Moreover, as illustrated in FIG. 14 (2), assume that, already in the global cache 132 on the computer 100, the entry regarding the object 211 has been stored in a column 4004, and the entry regarding the object 213 has been stored in a column 4006. When the present time-and-date has become 2002/05/09/0:00:456 JST and thus the interval time has elapsed, the entry stored in the column 4004 in FIG. 14 (2) is deleted. Meanwhile, with respect to the entry stored in the column 4006 therein, the object reference information is newly acquired from the naming service, thereby modifying the updating time-and-date to the present time-and-date, i.e., 2002/05/09/0:01:024 JST.

Figure 12:
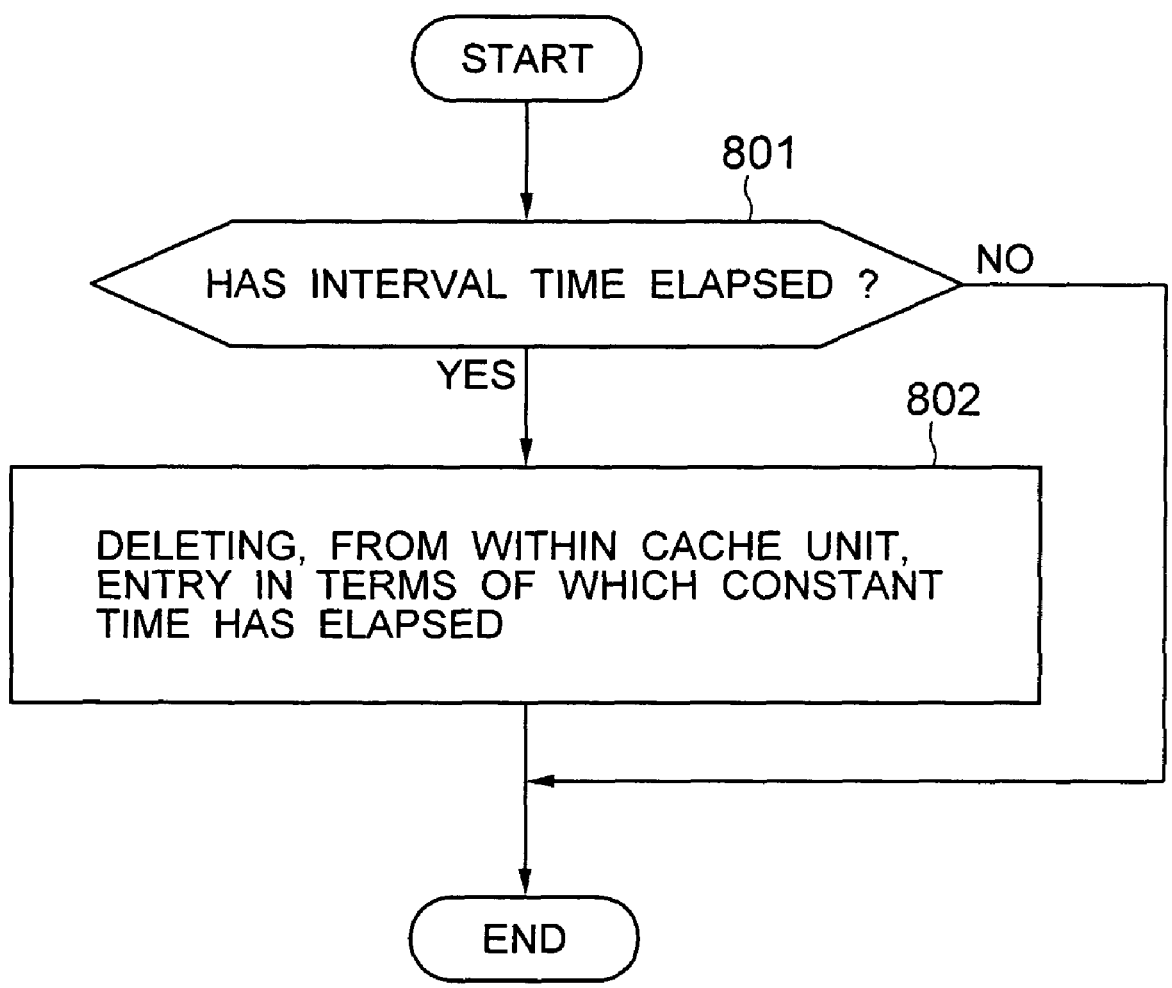
FIG. 12 is a flowchart for deleting an entry in terms of which a constant time has elapsed at the point-in-time when the interval time has elapsed.

FIG. 12 is a flowchart by which the cache control unit deletes an entry in the cache unit (i.e., the local cache or the global cache) in terms of which a constant time has elapsed at the point-in-time when the interval time has elapsed.

At first, it is checked whether or not the interval time has elapsed (step 801). If the interval time has not elapsed, the processing is terminated. Meanwhile, if the interval time has elapsed, an entry in terms of which a constant time has elapsed is deleted from within the cache unit, then terminating the processing (step 802).

Assume that, e.g., the interval time is 60 minutes, and the interval starting time-and-date is 2002/05/08/23:00:456 JST, and a cache entry in terms of which 60 minutes has elapsed will be deleted. In FIG. 14 (2) under this condition, the entry stored in the column 4006 on the table 4000 will be deleted.

In addition to the deletion processing for the global cache by the exception notification, the deletion/updating of the cache by the interval time, which has been indicated in FIG. 12 and FIG. 13, is executed. This allows the implementation of a periodical deletion/updating of the cache, thereby making it possible to decrease a probability that the exception will occur.

FIG. 13 is a flowchart by which the cache control unit controls the cache (i.e., the local cache or the global cache) by a cache number, that is capacity of cache, so as to perform the storage or deletion of the entries. Hereinafter, the explanation will be given below assuming that a maximum cache number and a minimum cache number have been specified in advance.

When the cache is requested to store object reference information (step 601), it is checked whether or not the object-reference-information number stored in the cache control unit has exceeded the maximum cache number (step 602). If the number has not exceeded the maximum cache number, the object reference information and the updating time-and-date are stored into the cache, then terminating the processing (step 604). Meanwhile, if the number has exceeded the maximum cache number, by the time the cache number has become smaller than the minimum cache number, the cache entries are deleted in a sequence starting from an entry with the oldest updating time-and-date (step 603).

When calling up an object that exists on the identical computer, the utilization of the local cache in the present invention makes it unnecessary to make the inquiry to the naming service. Also, when executing the processing request to the object, the utilization of the local cache prevents the communications therefor from occurring. Furthermore, even when calling up plural times an object that exists on the different computer, the utilization of the global cache in the present invention makes it unnecessary to make the inquiry to the naming service except for the first call-up.

From the explanation given so far, the present invention reduces the number of the communications that occur at the time of the retrieval, thereby making it possible to shorten the processing time for an object call-up. Also, the present invention reduces the number of the communications that occur at the time of the retrieval, thereby making it possible to reduce a load onto the naming service. Also, the present invention allows the implementation of a reduction in the communications that occur when making the processing request to an object that exists within an identical process.

As having been explained so far, according to the present invention, it becomes possible to reduce the number of the communications that occur at the time of retrieving an object to be executed.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A distributed object controlling method for a first computer for executing an object and having first and second reference-information storage areas, said first computer being connected to a second computer which has a naming service unit, comprising the steps of:
   storing, when executing an object in said first computer, object reference-information for said object in both said second reference-information storage area of said first computer and said naming service unit of said second computer, and judging, when executing a retrieval request of another object, whether or not object reference information on said another object has been stored in said second reference-information storage area,
   executing, when said object reference information on said another object has been stored in said second reference-information storage area, communication with said another object based on said object reference information of said another object;
   judging, when said object reference information on said another object has not been stored in said second reference-information storage area, whether or not object reference information on said another object has been stored in said first reference-information storage area;
   executing, when said object reference information on said another object has been stored in said first reference-information storage area, communication with said another object based on said object reference information on said another object stored in said first reference-information storage area;
   sending, when said object reference information on said another object has not been stored in said first reference-information storage area, a retrieval request to said second computer for providing said naming service, said retrieval request including an object name of said another object;
   storing object reference information and the object name of said another object into said first reference-information storage area, said object reference information being acquired as the response to said retrieval request;
   executing communication with said another object based on said acquired object reference information; and
   deleting said object reference information of said object from both said second reference-information storage area of said first computer and said naming service unit of said second computer.

2. The distributed object controlling method according to claim 1, further comprising a step of:
   if failure information has been acquired as the response to said communication with said another object based on said acquired object reference information, deleting all of object names and object reference information stored in said first reference-information storage area.

3. The distributed object controlling method according to claim 1, further comprising a step of:
   if failure information has been acquired as the response to said communication with said another object based on said acquired object reference information, deleting all of object names and object reference information corresponding to said object name stored in said first reference-information storage area.

4. The distributed object controlling method according to claim 1, further comprising a step of:
   if failure information has been acquired as the response to said communication with said another object, said failure information including an object name that has caused a failure, deleting the object name and the object reference information corresponding to said object name and stored in said first reference-information storage area, said object name having caused said failure.

5. The distributed object controlling method according to claim 1, further comprising the steps of:
   when storing said acquired object reference information and said object name into said first reference-information storage area, storing said object name therein after a registration point-in-time has been brought into correspondence with said object name;
   when a first predetermined time has elapsed, judging whether or not each registration point-in-time has elapsed by a second predetermined time, said each registration point-in-time being stored after having been brought into correspondence with said each object name stored in said first reference-information storage area, and
   deleting, from within said first reference-information storage area, an object name and object reference information whose registration point-in-time has elapsed by said second predetermined time;
   sending a retrieval request to said second computer for providing said naming service, said retrieval request including said object name; and
   storing, into said first reference-information storage area, object reference information, said object name, and a registration point-in-time acquired as the response to said retrieval request.

6. A first computer for executing an object in connection with a second computer, said first computer being connected to a second computer which has a naming service unit, comprising:
   a first and a second reference-information storage areas;
   means for storing, when executing an object in said first computer, object reference-information for said object in both said second reference-information storage area of said first computer and said naming service unit of said second computer, and judging, when executing a retrieval request of another object, whether or not object reference information on said another object has been stored in said second reference-information storage area;
   means for executing, when said object reference information on said another object has been stored in said second reference-information storage area, communication with said another object based on said object reference information on said another object;
   means for judging, when said object reference information on said another object has not been stored in said second reference-information storage area, whether or not object reference information on said another object has been stored in said first reference-information storage area;
   means for executing, when said object reference information on said another object has been stored in said first reference-information storage area, communication with said another object based on said object reference information on said another object stored in said first reference-information storage area;
   means for sending, when said object reference information on said another object has not been stored in said first reference-information storage area, a retrieval request to said second computer for providing said naming service, said retrieval request including an object name of said another object;

means for storing object reference information and the object name of said another object into said first reference-information storage area, said object reference information being acquired as the response to said retrieval request;

means for executing communication with said another object based on said acquired object reference; in formation; and means for deleting said object reference information of said object from both said second reference-information storage area of said first computer and said naming service unit of said second computer.

7. The first computer according to claim 6, further comprising:

means for deleting, if failure information has been acquired as the response to said communication with said another object based on said acquired object reference information, all of object names and object reference information stored in said first reference-information storage area.

8. The first computer according to claim 6, further comprising:

means for deleting, if failure information has been acquired as the response to said communication with said another object based on said acquired object reference information, all of object names and object reference information corresponding to said object name stored in said first reference-information storage area.

* * * * *